(12) United States Patent
Chui

(10) Patent No.: US 7,302,157 B2
(45) Date of Patent: Nov. 27, 2007

(54) SYSTEM AND METHOD FOR MULTI-LEVEL BRIGHTNESS IN INTERFEROMETRIC MODULATION

(75) Inventor: Clarence Chui, San Mateo, CA (US)

(73) Assignee: IDC, LLC, San Francisco, CA (US)

( * ) Notice: Subject to any disclaimer, the term of this patent is extended or adjusted under 35 U.S.C. 154(b) by 86 days.

(21) Appl. No.: 11/096,545

(22) Filed: Apr. 1, 2005

(65) Prior Publication Data
US 2006/0067643 A1    Mar. 30, 2006

Related U.S. Application Data

(60) Provisional application No. 60/613,539, filed on Sep. 27, 2004.

(51) Int. Cl.
*G02B 6/00* (2006.01)
(52) U.S. Cl. ........................... 385/147; 385/901
(58) Field of Classification Search ........... 385/39, 385/40, 147, 901; 359/247, 254
See application file for complete search history.

(56) References Cited

U.S. PATENT DOCUMENTS

| | | |
|---|---|---|
| 2,534,846 A | 12/1950 | Ambrose et al. |
| 3,439,973 A | 4/1969 | Paul et al. |
| 3,443,854 A | 5/1969 | Weiss |
| 3,653,741 A | 4/1972 | Marks |
| 3,656,836 A | 4/1972 | de Cremoux et al. |
| 3,725,868 A | 4/1973 | Malmer, Jr. et al. |
| 3,813,265 A | 5/1974 | Marks |
| 3,955,880 A | 5/1976 | Lierke |
| 4,099,854 A | 7/1978 | Decker et al. |
| 4,196,396 A | 4/1980 | Smith |
| 4,228,437 A | 10/1980 | Shelton |
| 4,377,324 A | 3/1983 | Durand et al. |
| 4,389,096 A | 6/1983 | Hori et al. |
| 4,392,711 A | 7/1983 | Moraw et al. |

(Continued)

FOREIGN PATENT DOCUMENTS

CN    157313    5/1991

(Continued)

OTHER PUBLICATIONS

Butler et al., "An Embedded Overlay Concept for Microsystems Packaging," IEEE Transactions on Advanced Packaging IEEE USA, vol. 23, No. 4, pp. 617-622, XP002379648 (2000).

(Continued)

*Primary Examiner*—Sarah Song
(74) *Attorney, Agent, or Firm*—Knobbe, Martens, Olson & Bear, LLP

(57) ABSTRACT

A display having a plurality of reflective display elements. In one embodiment, the display elements comprise at least one electrode having a plurality of active areas. In one embodiment, at least two of the sizes of the active areas are different with respect to each other, e.g., they are non-uniform in size. The interferometric modulators have a plurality of states, wherein selected ones of the interferometric modulators are configured to be actuated depending differing electrostatic forces in the interferometric modulators. The electrostatic forces in the interferometric modulators are different at least in part due to variations in the sizes of the active areas of the electrodes.

26 Claims, 11 Drawing Sheets

U.S. PATENT DOCUMENTS

| | | |
|---|---|---|
| 4,403,248 A | 9/1983 | te Velde |
| 4,441,791 A | 4/1984 | Hornbeck |
| 4,445,050 A | 4/1984 | Marks |
| 4,459,182 A | 7/1984 | te Velde |
| 4,482,213 A | 11/1984 | Piliavin et al. |
| 4,500,171 A | 2/1985 | Penz et al. |
| 4,519,676 A | 5/1985 | te Velde |
| 4,531,126 A | 7/1985 | Sadones |
| 4,566,935 A | 1/1986 | Hornbeck |
| 4,571,603 A | 2/1986 | Hornbeck et al. |
| 4,596,992 A | 6/1986 | Hornbeck |
| 4,615,595 A | 10/1986 | Hornbeck |
| 4,662,746 A | 5/1987 | Hornbeck |
| 4,663,083 A | 5/1987 | Marks |
| 4,666,254 A | 5/1987 | Itoh et al. |
| 4,681,403 A | 7/1987 | te Velde et al. |
| 4,710,732 A | 12/1987 | Hornbeck |
| 4,748,366 A | 5/1988 | Taylor |
| 4,786,128 A | 11/1988 | Birnbach |
| 4,790,635 A | 12/1988 | Apsley |
| 4,856,863 A | 8/1989 | Sampsell et al. |
| 4,857,978 A | 8/1989 | Goldburt et al. |
| 4,859,060 A | 8/1989 | Katagiri et al. |
| 4,900,136 A | 2/1990 | Goldburt et al. |
| 4,900,395 A | 2/1990 | Syverson et al. |
| 4,937,496 A | 6/1990 | Neiger et al. |
| 4,954,789 A | 9/1990 | Sampsell |
| 4,956,619 A | 9/1990 | Hornbeck |
| 4,965,562 A | 10/1990 | Verhulst |
| 4,982,184 A | 1/1991 | Kirkwood |
| 5,018,256 A | 5/1991 | Hornbeck |
| 5,022,745 A | 6/1991 | Zayhowski et al. |
| 5,028,939 A | 7/1991 | Hornbeck et al. |
| 5,037,173 A | 8/1991 | Sampsell et al. |
| 5,044,736 A | 9/1991 | Jaskie et al. |
| 5,061,049 A | 10/1991 | Hornbeck |
| 5,075,796 A | 12/1991 | Schildkraut et al. |
| 5,078,479 A | 1/1992 | Vuilleumier |
| 5,079,544 A | 1/1992 | DeMond et al. |
| 5,083,857 A | 1/1992 | Hornbeck |
| 5,096,279 A | 3/1992 | Hornbeck et al. |
| 5,099,353 A | 3/1992 | Hornbeck |
| 5,124,834 A | 6/1992 | Cusano et al. |
| 5,136,669 A | 8/1992 | Gerdt |
| 5,142,405 A | 8/1992 | Hornbeck |
| 5,142,414 A | 8/1992 | Koehler |
| 5,153,771 A | 10/1992 | Link et al. |
| 5,162,787 A | 11/1992 | Thompson et al. |
| 5,168,406 A | 12/1992 | Nelson |
| 5,170,156 A | 12/1992 | DeMond et al. |
| 5,172,262 A | 12/1992 | Hornbeck |
| 5,179,274 A | 1/1993 | Sampsell |
| 5,192,395 A | 3/1993 | Boysel et al. |
| 5,192,946 A | 3/1993 | Thompson et al. |
| 5,206,629 A | 4/1993 | DeMond et al. |
| 5,212,582 A | 5/1993 | Nelson |
| 5,214,419 A | 5/1993 | DeMond et al. |
| 5,214,420 A | 5/1993 | Thompson et al. |
| 5,216,537 A | 6/1993 | Hornbeck |
| 5,226,099 A | 7/1993 | Mignardi et al. |
| 5,228,013 A | 7/1993 | Bik |
| 5,231,532 A | 7/1993 | Magel et al. |
| 5,233,385 A | 8/1993 | Sampsell |
| 5,233,456 A | 8/1993 | Nelson |
| 5,233,459 A | 8/1993 | Bozler et al. |
| 5,254,980 A | 10/1993 | Hendrix et al. |
| 5,272,473 A | 12/1993 | Thompson et al. |
| 5,278,652 A | 1/1994 | Urbanus et al. |
| 5,280,277 A | 1/1994 | Hornbeck |
| 5,287,096 A | 2/1994 | Thompson et al. |
| 5,293,272 A | 3/1994 | Jannson et al. |
| 5,296,950 A | 3/1994 | Lin et al. |
| 5,305,640 A | 4/1994 | Boysel et al. |
| 5,311,360 A | 5/1994 | Bloom et al. |
| 5,312,513 A | 5/1994 | Florence et al. |
| 5,323,002 A | 6/1994 | Sampsell et al. |
| 5,324,683 A | 6/1994 | Fitch et al. |
| 5,325,116 A | 6/1994 | Sampsell |
| 5,326,430 A | 7/1994 | Cronin et al. |
| 5,327,286 A | 7/1994 | Sampsell et al. |
| 5,331,454 A | 7/1994 | Hornbeck |
| 5,339,116 A | 8/1994 | Urbanus et al. |
| 5,345,328 A | 9/1994 | Fritz et al. |
| 5,355,357 A | 10/1994 | Yamamori et al. |
| 5,358,601 A | 10/1994 | Cathey |
| 5,365,283 A | 11/1994 | Doherty et al. |
| 5,381,232 A | 1/1995 | Van Wijk |
| 5,381,253 A | 1/1995 | Sharp et al. |
| 5,401,983 A | 3/1995 | Jokerst et al. |
| 5,411,769 A | 5/1995 | Hornbeck |
| 5,444,566 A | 8/1995 | Gale et al. |
| 5,446,479 A | 8/1995 | Thompson et al. |
| 5,448,314 A | 9/1995 | Heimbuch et al. |
| 5,452,024 A | 9/1995 | Sampsell |
| 5,454,906 A | 10/1995 | Baker et al. |
| 5,457,493 A | 10/1995 | Leddy et al. |
| 5,457,566 A | 10/1995 | Sampsell et al. |
| 5,459,602 A | 10/1995 | Sampsell |
| 5,459,610 A | 10/1995 | Bloom et al. |
| 5,461,411 A | 10/1995 | Florence et al. |
| 5,474,865 A | 12/1995 | Vasudev |
| 5,489,952 A | 2/1996 | Gove et al. |
| 5,497,172 A | 3/1996 | Doherty et al. |
| 5,497,197 A | 3/1996 | Gove et al. |
| 5,499,037 A | 3/1996 | Nakagawa et al. |
| 5,499,062 A | 3/1996 | Urbanus |
| 5,500,635 A | 3/1996 | Mott |
| 5,500,761 A | 3/1996 | Goossen et al. |
| 5,506,597 A | 4/1996 | Thompson et al. |
| 5,515,076 A | 5/1996 | Thompson et al. |
| 5,517,347 A | 5/1996 | Sampsell |
| 5,523,803 A | 6/1996 | Urbanus et al. |
| 5,526,051 A | 6/1996 | Gove et al. |
| 5,526,172 A * | 6/1996 | Kanack ..................... 359/291 |
| 5,526,327 A | 6/1996 | Cordova, Jr. |
| 5,526,688 A | 6/1996 | Boysel et al. |
| 5,535,047 A | 7/1996 | Hornbeck |
| 5,548,301 A | 8/1996 | Kornher et al. |
| 5,551,293 A | 9/1996 | Boysel et al. |
| 5,552,924 A | 9/1996 | Tregilgas |
| 5,552,925 A | 9/1996 | Worley |
| 5,559,358 A | 9/1996 | Burns et al. |
| 5,563,398 A | 10/1996 | Sampsell |
| 5,567,334 A | 10/1996 | Baker et al. |
| 5,570,135 A | 10/1996 | Gove et al. |
| 5,579,149 A | 11/1996 | Moret et al. |
| 5,581,272 A | 12/1996 | Conner et al. |
| 5,583,688 A | 12/1996 | Hornbeck |
| 5,589,852 A | 12/1996 | Thompson et al. |
| 5,597,736 A | 1/1997 | Sampsell |
| 5,600,383 A | 2/1997 | Hornbeck |
| 5,602,671 A | 2/1997 | Hornbeck |
| 5,606,441 A | 2/1997 | Florence et al. |
| 5,608,468 A | 3/1997 | Gove et al. |
| 5,610,438 A | 3/1997 | Wallace et al. |
| 5,610,624 A | 3/1997 | Bhuva |
| 5,610,625 A | 3/1997 | Sampsell |
| 5,614,937 A | 3/1997 | Nelson |
| 5,619,059 A | 4/1997 | Li et al. |
| 5,619,365 A | 4/1997 | Rhoades et al. |
| 5,619,366 A | 4/1997 | Rhoads et al. |
| 5,629,790 A | 5/1997 | Neukermans et al. |
| 5,633,652 A | 5/1997 | Kanbe et al. |
| 5,636,052 A | 6/1997 | Arney et al. |

| | | | | | | |
|---|---|---|---|---|---|---|
| 5,636,185 | A | 6/1997 | Brewer et al. | 6,376,787 | B1 | 4/2002 | Martin et al. |
| 5,638,084 | A | 6/1997 | Kalt | 6,407,851 | B1 | 6/2002 | Islam et al. |
| 5,638,946 | A | 6/1997 | Zavracky | 6,417,868 | B1 | 7/2002 | Bock et al. |
| 5,641,391 | A | 6/1997 | Hunter et al. | 6,433,917 | B1 | 8/2002 | Mei et al. |
| 5,646,768 | A | 7/1997 | Kaeiyama | 6,438,282 | B1 | 8/2002 | Takeda et al. |
| 5,650,881 | A | 7/1997 | Hornbeck | 6,447,126 | B1 | 9/2002 | Hornbeck |
| 5,654,741 | A | 8/1997 | Sampsell et al. | 6,449,084 | B1* | 9/2002 | Guo ................... 359/315 |
| 5,657,099 | A | 8/1997 | Doherty et al. | 6,456,420 | B1 | 9/2002 | Goodwin-Johansson |
| 5,659,374 | A | 8/1997 | Gale, Jr. et al. | 6,465,355 | B1 | 10/2002 | Horsley |
| 5,661,591 | A | 8/1997 | Lin et al. | 6,466,190 | B1 | 10/2002 | Evoy |
| 5,665,997 | A | 9/1997 | Weaver et al. | 6,466,354 | B1 | 10/2002 | Gudeman |
| 5,673,139 | A | 9/1997 | Johnson | 6,466,358 | B2 | 10/2002 | Tew |
| 5,683,591 | A | 11/1997 | Offenberg | 6,473,072 | B1 | 10/2002 | Comiskey et al. |
| 5,703,710 | A | 12/1997 | Brinkman et al. | 6,473,274 | B1 | 10/2002 | Maimone et al. |
| 5,710,656 | A | 1/1998 | Goosen | 6,480,177 | B2 | 11/2002 | Doherty et al. |
| 5,726,480 | A | 3/1998 | Pister | 6,496,122 | B2 | 12/2002 | Sampsell |
| 5,739,945 | A | 4/1998 | Tayebati | 6,545,335 | B1 | 4/2003 | Chua et al. |
| 5,740,150 | A | 4/1998 | Uchimaru et al. | 6,548,908 | B2 | 4/2003 | Chua et al. |
| 5,745,193 | A | 4/1998 | Urbanus et al. | 6,549,338 | B1 | 4/2003 | Wolverton et al. |
| 5,745,281 | A | 4/1998 | Yi et al. | 6,552,840 | B2 | 4/2003 | Knipe |
| 5,751,469 | A | 5/1998 | Arney et al. | 6,574,033 | B1 | 6/2003 | Chui et al. |
| 5,771,116 | A | 6/1998 | Miller et al. | 6,589,625 | B1 | 7/2003 | Kothari et al. |
| 5,784,190 | A | 7/1998 | Worley | 6,600,201 | B2 | 7/2003 | Hartwell et al. |
| 5,784,212 | A | 7/1998 | Hornbeck | 6,606,175 | B1 | 8/2003 | Sampsell et al. |
| 5,786,927 | A | 7/1998 | Greywall et al. | 6,608,268 | B1 | 8/2003 | Goldsmith |
| 5,793,504 | A | 8/1998 | Stoll | 6,624,944 | B1 | 9/2003 | Wallace et al. |
| 5,808,780 | A | 9/1998 | McDonald | 6,625,047 | B2 | 9/2003 | Coleman, Jr. |
| 5,808,781 | A | 9/1998 | Arney et al. | 6,630,786 | B2 | 10/2003 | Cummings et al. |
| 5,818,095 | A | 10/1998 | Sampsell | 6,632,698 | B2 | 10/2003 | Ives |
| 5,825,528 | A | 10/1998 | Goosen | 6,635,919 | B1 | 10/2003 | Melendez et al. |
| 5,835,255 | A | 11/1998 | Miles | 6,643,069 | B2 | 11/2003 | Dewald |
| 5,838,484 | A | 11/1998 | Goossen | 6,650,455 | B2 | 11/2003 | Miles |
| 5,842,088 | A | 11/1998 | Thompson | 6,657,832 | B2 | 12/2003 | Williams et al. |
| 5,905,482 | A | 5/1999 | Hughes et al. | 6,660,656 | B2 | 12/2003 | Cheung et al. |
| 5,912,758 | A | 6/1999 | Knipe et al. | 6,666,561 | B1 | 12/2003 | Blakley |
| 5,943,158 | A | 8/1999 | Ford et al. | 6,674,090 | B1 | 1/2004 | Chua et al. |
| 5,959,763 | A | 9/1999 | Bozler et al. | 6,674,562 | B1 | 1/2004 | Miles et al. |
| 5,986,796 | A | 11/1999 | Miles | 6,680,792 | B2 | 1/2004 | Miles |
| 5,994,174 | A | 11/1999 | Carey et al. | 6,710,908 | B2 | 3/2004 | Miles et al. |
| 6,028,690 | A | 2/2000 | Carter et al. | 6,741,377 | B2 | 5/2004 | Miles |
| 6,038,056 | A | 3/2000 | Florence et al. | 6,741,383 | B2 | 5/2004 | Huibers et al. |
| 6,040,937 | A | 3/2000 | Miles | 6,741,384 | B1 | 5/2004 | Martin et al. |
| 6,046,840 | A | 4/2000 | Huibers | 6,741,503 | B1 | 5/2004 | Farris et al. |
| 6,049,317 | A | 4/2000 | Thompson et al. | 6,747,785 | B2 | 6/2004 | Chen et al. |
| 6,055,090 | A | 4/2000 | Miles | 6,747,800 | B1 | 6/2004 | Lin |
| 6,056,406 | A | 5/2000 | Park et al. | 6,775,174 | B2 | 8/2004 | Huffman et al. |
| 6,061,075 | A | 5/2000 | Nelson et al. | 6,778,155 | B2 | 8/2004 | Doherty et al. |
| 6,097,145 | A | 8/2000 | Kastalsky et al. | 6,794,119 | B2 | 9/2004 | Miles |
| 6,099,132 | A | 8/2000 | Kaeriyama | 6,809,788 | B2 | 10/2004 | Yamada et al. |
| 6,100,872 | A | 8/2000 | Aratani et al. | 6,811,267 | B1 | 11/2004 | Allen et al. |
| 6,113,239 | A | 9/2000 | Sampsell et al. | 6,819,469 | B1 | 11/2004 | Koba |
| 6,147,790 | A | 11/2000 | Meier et al. | 6,822,628 | B2 | 11/2004 | Dunphy et al. |
| 6,158,156 | A | 12/2000 | Patrick | 6,829,132 | B2 | 12/2004 | Martin et al. |
| 6,160,833 | A | 12/2000 | Floyd et al. | 6,853,129 | B1 | 2/2005 | Cummings et al. |
| 6,171,945 | B1 | 1/2001 | Mandal et al. | 6,855,610 | B2 | 2/2005 | Tung et al. |
| 6,172,797 | B1 | 1/2001 | Huibers | 6,859,218 | B1 | 2/2005 | Luman et al. |
| 6,180,428 | B1 | 1/2001 | Peeters et al. | 6,861,277 | B1 | 3/2005 | Monroe et al. |
| 6,195,196 | B1 | 2/2001 | Koichi | 6,862,022 | B2 | 3/2005 | Slupe |
| 6,201,633 | B1 | 3/2001 | Peeters et al. | 6,862,029 | B1 | 3/2005 | D'Souza et al. |
| 6,215,221 | B1 | 4/2001 | Cabuz et al. | 6,867,896 | B2 | 3/2005 | Miles |
| 6,232,936 | B1 | 5/2001 | Gove et al. | 6,870,581 | B2 | 3/2005 | Li et al. |
| 6,239,777 | B1 | 5/2001 | Sugahara et al. | 6,870,654 | B2 | 3/2005 | Lin et al. |
| 6,243,149 | B1 | 6/2001 | Swanson et al. | 6,882,458 | B2 | 4/2005 | Lin et al. |
| 6,282,010 | B1 | 8/2001 | Sulzbach et al. | 6,882,461 | B1 | 4/2005 | Tsai et al. |
| 6,288,472 | B1 | 9/2001 | Cabuz et al. | 6,891,658 | B2 | 5/2005 | Whitehead et al. |
| 6,288,824 | B1 | 9/2001 | Kastalsky | 6,912,022 | B2 | 6/2005 | Lin et al. |
| 6,295,154 | B1 | 9/2001 | Laor et al. | 6,947,200 | B2 | 9/2005 | Huibers |
| 6,323,982 | B1 | 11/2001 | Hornbeck | 6,952,303 | B2 | 10/2005 | Lin et al. |
| 6,327,071 | B1 | 12/2001 | Kimura | 6,958,847 | B2 | 10/2005 | Lin |
| 6,331,909 | B1 | 12/2001 | Dunfield | 6,959,990 | B2 | 11/2005 | Penn |
| 6,335,831 | B2 | 1/2002 | Kowarz et al. | 7,008,812 | B1 | 3/2006 | Carley |
| 6,356,254 | B1 | 3/2002 | Kimura | 7,053,737 | B2 | 5/2006 | Schwartz et al. |
| 6,358,021 | B1 | 3/2002 | Cabuz | 7,075,700 | B2 | 7/2006 | Muenter |

| | | | | | | |
|---|---|---|---|---|---|---|
| 2001/0003487 A1 | 6/2001 | Miles | | 2004/0263944 A1 | 12/2004 | Miles et al. |
| 2001/0028503 A1 | 10/2001 | Flanders et al. | | 2005/0001828 A1 | 1/2005 | Martin et al. |
| 2002/0014579 A1 | 2/2002 | Dunfield | | 2005/0002082 A1 | 1/2005 | Miles |
| 2002/0015215 A1 | 2/2002 | Miles | | 2005/0003667 A1 | 1/2005 | Lin et al. |
| 2002/0021485 A1 | 2/2002 | Pilossof | | 2005/0014374 A1 | 1/2005 | Partridge et al. |
| 2002/0024711 A1 | 2/2002 | Miles | | 2005/0024557 A1 | 2/2005 | Lin |
| 2002/0027636 A1 | 3/2002 | Yamada | | 2005/0035699 A1 | 2/2005 | Tsai |
| 2002/0054424 A1 | 5/2002 | Miles | | 2005/0036095 A1 | 2/2005 | Yeh et al. |
| 2002/0075555 A1 | 6/2002 | Miles | | 2005/0036192 A1 | 2/2005 | Lin et al. |
| 2002/0114558 A1 | 8/2002 | Nemirovsky | | 2005/0038950 A1 | 2/2005 | Adelmann |
| 2002/0126364 A1 | 9/2002 | Miles | | 2005/0042117 A1 | 2/2005 | Lin |
| 2002/0139981 A1 | 10/2002 | Young | | 2005/0046922 A1 | 3/2005 | Lin et al. |
| 2002/0146200 A1 | 10/2002 | Kurdle et al. | | 2005/0046948 A1 | 3/2005 | Lin |
| 2002/0149828 A1 | 10/2002 | Miles | | 2005/0057442 A1 | 3/2005 | Way |
| 2002/0149850 A1 | 10/2002 | Heffner et al. | | 2005/0068583 A1 | 3/2005 | Gutlowski et al. |
| 2002/0167072 A1 | 11/2002 | Andosca | | 2005/0068605 A1 | 3/2005 | Tsai |
| 2002/0167730 A1 | 11/2002 | Needham et al. | | 2005/0068606 A1 | 3/2005 | Tsai |
| 2002/0186483 A1 | 12/2002 | Hagelin et al. | | 2005/0069209 A1 | 3/2005 | Damera-Venkata et al. |
| 2003/0015936 A1 | 1/2003 | Yoon et al. | | 2005/0078348 A1 | 4/2005 | Lin |
| 2003/0016428 A1 | 1/2003 | Kato et al. | | 2005/0157364 A1 | 7/2005 | Lin |
| 2003/0029705 A1 | 2/2003 | Qui et al. | | 2005/0168849 A1 | 8/2005 | Lin |
| 2003/0043157 A1 | 3/2003 | Miles | | 2005/0195462 A1 | 9/2005 | Lin |
| 2003/0053078 A1 | 3/2003 | Missey et al. | | 2005/0195467 A1 | 9/2005 | Kothari et al. |
| 2003/0072070 A1 | 4/2003 | Miles | | 2005/0202649 A1 | 9/2005 | Hung et al. |
| 2003/0156315 A1 | 8/2003 | Li et al. | | 2005/0249966 A1 | 11/2005 | Tung et al. |
| 2003/0202264 A1 | 10/2003 | Weber et al. | | 2006/0044654 A1 | 3/2006 | Vandorpe et al. |
| 2003/0202265 A1 | 10/2003 | Reboa et al. | | 2006/0066640 A1 | 3/2006 | Kothari et al. |
| 2003/0202266 A1 | 10/2003 | Ring et al. | | 2006/0077155 A1 | 4/2006 | Chui et al. |
| 2003/0210851 A1 | 11/2003 | Fu et al. | | 2006/0077507 A1 | 4/2006 | Chui et al. |
| 2004/0008396 A1 | 1/2004 | Stappaerts | | 2006/0077533 A1 | 4/2006 | Miles et al. |
| 2004/0008438 A1 | 1/2004 | Sato | | 2006/0139723 A9 | 6/2006 | Miles |
| 2004/0027671 A1 | 2/2004 | Wu et al. | | | | |
| 2004/0027701 A1 | 2/2004 | Ishikawa | | FOREIGN PATENT DOCUMENTS | | |
| 2004/0051929 A1 | 3/2004 | Sampsell et al. | | DE | 4108966 A1 | 9/1992 |
| 2004/0056742 A1 | 3/2004 | Dabbaj | | DE | 10228946 A1 | 1/2004 |
| 2004/0058532 A1 | 3/2004 | Miles et al. | | EP | 0 310 176 A2 | 4/1989 |
| 2004/0075967 A1 | 4/2004 | Lynch et al. | | EP | 0 361 981 | 4/1990 |
| 2004/0080035 A1 | 4/2004 | Delapierre | | EP | 0 667 548 A1 | 8/1995 |
| 2004/0080807 A1 | 4/2004 | Chen et al. | | EP | 0 788 005 | 8/1997 |
| 2004/0100594 A1 | 5/2004 | Huibers et al. | | EP | 1275997 | 1/2003 |
| 2004/0100680 A1 | 5/2004 | Huibers et al. | | EP | 1 435 336 | 7/2004 |
| 2004/0124483 A1 | 7/2004 | Partridge et al. | | EP | 1 473 691 A | 11/2004 |
| 2004/0125281 A1 | 7/2004 | Lin | | EP | 1473581 A2 | 11/2004 |
| 2004/0125347 A1 | 7/2004 | Patel et al. | | EP | 1484635 | 12/2004 |
| 2004/0136045 A1 | 7/2004 | Tran | | FR | 2 824 643 A | 11/2002 |
| 2004/0140557 A1 | 7/2004 | Sun et al. | | JP | 62 082454 | 4/1987 |
| 2004/0145049 A1 | 7/2004 | McKinnell et al. | | JP | 05275401 A1 | 10/1993 |
| 2004/0145811 A1 | 7/2004 | Lin et al. | | JP | 9-127439 | 5/1997 |
| 2004/0147056 A1 | 7/2004 | McKinnell et al. | | JP | 11211999 | 8/1999 |
| 2004/0147198 A1 | 7/2004 | Lin et al. | | JP | 11211999 A | 11/1999 |
| 2004/0148009 A1 | 7/2004 | Buzzard et al. | | JP | 2000306515 A | 11/2000 |
| 2004/0150939 A1 | 8/2004 | Huff | | JP | 2000306515 A * | 11/2000 |
| 2004/0160143 A1 | 8/2004 | Shreeve et al. | | JP | 2002-062490 | 2/2002 |
| 2004/0174583 A1 | 9/2004 | Chen et al. | | JP | 2002277771 A | 9/2002 |
| 2004/0175577 A1 | 9/2004 | Lin et al. | | JP | 2003195201 A | 7/2003 |
| 2004/0179281 A1 | 9/2004 | Reboa | | JP | 2004157527 A | 6/2004 |
| 2004/0179445 A1 | 9/2004 | Park et al. | | JP | 2004235465 A | 8/2004 |
| 2004/0184766 A1 | 9/2004 | Kim et al. | | JP | 2004286825 A | 10/2004 |
| 2004/0201908 A1 | 10/2004 | Kaneko | | WO | WO9530924 | 11/1995 |
| 2004/0207897 A1 | 10/2004 | Lin | | WO | WO9717628 | 5/1997 |
| 2004/0209192 A1 | 10/2004 | Lin et al. | | WO | WO9952006 A2 | 10/1999 |
| 2004/0209195 A1 | 10/2004 | Lin | | WO | WO9952006 A3 | 10/1999 |
| 2004/0212026 A1 | 10/2004 | Van Brocklin et al. | | WO | WO 02/079853 | 10/2002 |
| 2004/0217378 A1 | 11/2004 | Martin et al. | | WO | WO03007049 A1 | 1/2003 |
| 2004/0217919 A1 | 11/2004 | Pichl et al. | | WO | WO 03/014789 A2 | 2/2003 |
| 2004/0218251 A1 | 11/2004 | Piehl et al. | | WO | WO 03/054925 | 7/2003 |
| 2004/0218334 A1 | 11/2004 | Martin et al. | | WO | WO 03/069404 | 8/2003 |
| 2004/0218341 A1 | 11/2004 | Martin et al. | | WO | WO03069413 A1 | 8/2003 |
| 2004/0227493 A1 | 11/2004 | Van Brocklin et al. | | WO | WO03073151 A1 | 9/2003 |
| 2004/0233503 A1 | 11/2004 | Kimura | | WO | WO 03/085728 A1 | 10/2003 |
| 2004/0240032 A1 | 12/2004 | Miles | | WO | WO2004006003 A1 | 1/2004 |
| 2004/0240138 A1 | 12/2004 | Martin et al. | | WO | WO2004026757 A2 | 4/2004 |
| 2004/0245588 A1 | 12/2004 | Nikkel et al. | | | | |

| | | |
|---|---|---|
| WO | WO 2005/006364 A1 | 1/2005 |
| WO | WO 2006/014929 | 2/2006 |

OTHER PUBLICATIONS

Chunjun Wang et al., "Flexible curcuit-based RF MEMS Switches," MEMS. XP002379649 pp. 757-762, (Nov. 2001).
Goossen, "MEMS-based variable optical interference devices," Optical MEMS, 2000 IEEE/LEDS Int'l. Conf. on Aug. 21-24, 2000, Piscatawny, NJ, Aug, 21, 2000, pp. 17-18.
Jerman et al., "Miniature Fabry-Perot Interferometers Micromachined in Silicon for Use in Optical Fiber WDM Systems," Transducers, San Francisco, Jun. 24-27, 1991, Proceedings on the Int'l. Conf. on Solid State Sensors and Actuators, vol. CONF. 6, Jun. 24, 1991, pp. 372-375.
Joannopoulos et al., "Molding the Flow of Light," Photonic Crystals. 1995.
Nagami et al., "Plastic Cell Architecture: Towards Reconfigurable Computing for General-Purpose," Proc. IEEE Workshop on FPGA-based Custom Computing Machines, (1998).
Peerlings et al., "Long Resonator Micromachined Tunable GaAs-AlAs Fabry-Perot Filter," IEEE Photonics Technology Letters, IEEE Service Center, Piscatawny, NJ, vol. 9, No. 9, Sep. 1997, pp. 1235-1237.
Wu et al., "MEMS Designed for Tunable Capacitors," Microwave Symposium Digest, 1998 IEEE MTT-S Int'l., Baltimore, MD, Jun. 7-12, 1998, vol. 1, pp. 127-129.
Zhou et al., "Waveguide Panel Display Using Electromechanical Spatial Modulators," SID Digest, vol. XXIX, 1998.
International Search Report and Written Opinion of the International Searching Authority for PCT/US2005/005919 dated Aug. 24, 2005.
International Search Report Application No. PCT/US2005/026448, Dated Nov. 23, 2005.
International Search Report Application No. PCT/US2005/029820, Dated Dec. 27, 2005.
International Search Report Application No. PCT/US2005/030962, Dated Aug. 31, 2005.
International Search Report Application No. PCT/US2005/034465, Dated Sep. 23, 2005.
European Search Report Application No. 05255693.3-2217, dated May 24, 2006.
European Search Report Application No. EP 05 25 5673 in 9 pages, dated Jan. 24, 2006.
Austrian Search Report No. 162/2005, Dated Jul. 14, 2005.
Austrian Search Report No. 164/2005, Dated Jul. 4, 2005.
Austrian Search Report No. 140/2005, Dated Jul. 15, 2005.
Austrian Search Report No. 161/2005, Dated Jul. 15, 2005.
Austrian Search Report No. 150/2005, Dated Jul. 29, 2005.
Austrian Search Report No. 66/2005, Dated May 9, 2005.
Akasaka, "Three-Dimensional IC Trends", Proceedings of IEEE, vol. 74, No. 12, pp. 1703-1714, (Dec. 1986).
Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb.1993).
Aratani K., et al., "Surface micromachined tuneable interferometer array," Sensors and Actuators, pp. 17-23. (1994).
Bass, "Handbook of Optics, vol. I, Fundamentals, Techniques, and Design, Second Edition," McGraw-Hill, Inc., New York, pp. 2.29-2.36 (1995).
Chiou et al., "A Novel Capacitance Control Design of Tunable Capacitor Using Multiple Electrostatic Driving Electrodes," Proceedings of the 2001 1st Conference on Nanotechnology, pp. 319-324 (Oct. 2001).
Conner, "Hybrid Color Display Using Optical Interference Filter Array," SID Digest, pp. 577-580 (1993).
Giles et al., "A Silicon MEMS Optical Switch Attenuator and Its Use in Lightwave Subsystems," IEEE Journal of Selected Topics in Quanum Electronics, vol. 5, No. 1, pp. 18-25, (Jan./Feb. 1999).
Goossen et al., "Possible Display Applications of the Silicon Mechanical Anti-Reflection Switch," Society for Information Display (1994).
Goossen et al., "Silicon Modulator Based on Mechanically-Active Anti-Reflection Layer with 1Mbit/sec Capability for Fiber-in-the-Loop Applications," IEEE Photonics Technology Letters, pp. 1119-1121 (Sep. 1994).
Gosch, "West Germany Grabs the Lead in X-Ray Lithography," Electronics pp. 78-80 (Feb. 5, 1987).
Howard et al., "Nanometer-Scale Fabrication Techniques", VLSI Electronics: Microstructure Science, vol. 5, pp. 145-153 and pp. 166-173 (1982).
Ibbotson et al., "Comparison of XeF2 and F-atom reactions with Si and SiO2," Applied Physics Letters, vol. 44, No. 12, pp. 1129-1131 (Jun. 1984).
Jackson "Classical Electrodynamics", John Wiley & Sons Inc., pp. 568-573. (date unknown).
Jerman et al., "A Miniature Fabry-Perot Interferometer with a Corrugated Silicon Diaphragm Support", (1988).
Johnson "Optical Scanners", Microwave Scanning Antennas, vol. 1, p. 251-261, (1964).
Light over Matter, Circle No. 36 (Jun. 1993).
Miles, Mark, W., "A New Reflective FPD Technology Using Interferometric Modulation", The Proceedings of the Society for Information Display (May 11-16, 1997).
Newsbreaks, "Quantum-trench devices might operate at terahertz frequencies", Laser Focus World (May 1993).
Oliner et al., "Radiating Elements and Mutual Coupling", Microwave Scanning Antennas, vol. 2, pp. 131-141, (1966).
Raley et al., "A Fabry-Perot Microinterferometer for Visible Wavelengths", IEEE Solid-State Sensor and Actuator Workshop, Jun. 1992, Hilton Head, SC.
Schnakenberg, et al. TMAHW Etchants for Silicon Micromachining. 1991 International Conference on Solid State Sensors and Actuators-Digest of Technical Papers. pp. 815-818.
Sperger et al., "High Performance Patterned All-Dielectric Interference Colour Filter for Display Applications", SID Digest, pp. 81-83, (1994).
Stone, "Radiation and Optics, An Introduction to the Classical Theory", McGraw-Hill, pp. 340-343, (1963).
Walker, et al., "Electron-beam-tunable Interference Filter Spatial Light Modulator", Optics Letters vol. 13, No. 5, pp. 345-347, (May 1988).
Williams, et al. Etch Rates for Micromachining Processing. Journal of Microelectromechanical Systems, vol. 5, No. 4, pp. 256-259, (Dec. 1996).
Winters, et al. The etching of silicon with XeF2 vapor. Applied Physics Letters, vol. 34, No. 1, pp. 70-73, (Jan. 1979).
Winton, John M., "A novel way to capture solar energy", Chemical Week, (May 1985).
Wu, "Design of a Reflective Color LCD Using Optical Interference Reflectors", ASIA Display '95, pp. 929-931, (Oct. 1995).
Austrian Patent Office Search Report dated Aug. 11, 2005.
Fan et al., "Channel Drop Filters in Photonic Crystals," Optics Express, vol. 3, No. 1, 1998.
Fork, et al., "P-67: Chip on Glass Bonding using StressedMetal™ Technology" Sid 05 Digest, May 24, 2005.
Kim et al., "Control of Optical Transmission Through metals Perforated With Subwave-Length Hole Arrays," Optic Letters, vol. 24, No. 4, Feb. 15, 1999, pp. 256-257.
Lin et al., "Free-Space Michromachined Optical Switches for Optical Networking," IEEE Journal of Selected Topics in Quantum Electronics, vol. 5, No. 1m Jan./Feb. 1999, pp. 4-9.
Little et al., "Vertically Coupled Microring Resonator Channel Dropping Filter," IEEE Photonics Technology Letters, vol. 11, No. 2, 1999.
Magel, "Integrated Optic Devices Using Micromachined Metal Membranes," SPIE vol. 2686, 0-8194-2060-3/1996.
Science and Technology, The Economist, May 22, 1999, pp. 89-90.

* cited by examiner

| | Column Output Signals | |
|---|---|---|
| | $+V_{bias}$ | $-V_{bias}$ |
| Row Output Signals   0 | Stable | Stable |
| $+\Delta V$ | Release | Actuate |
| $-\Delta V$ | Actuate | Release |

| $V_D$ \ $V_C$ | $V_B-\Delta_2$ | $V_B-\Delta_1$ | $V_B$ | $V_B$ | $V_B+\Delta_1$ | $V_B+\Delta_2$ |
|---|---|---|---|---|---|---|
| $-V_B$ | — | — | 0 | $2V_B$ | $2V_B+\Delta_1$ | $2V_B+\Delta_2$ |
| ACTUATED | — | — | NONE | M1 | M1+M2 | M1+M2+M3 |
| 0 | $-V_B-\Delta_2$ | $-V_B-\Delta_1$ | $-V_B$ | $V_B$ | $V_B+\Delta_1$ | $V_B-\Delta_2$ |
| ACTUATED | NONE | NONE | NONE | NONE | NONE | NONE |
| $V_B$ | $-2V_B-\Delta_2$ | $-2V_B-\Delta_1$ | $-2V_B$ | 0 | — | — |
| ACTUATED | M1+M2+M3 | M1+M2 | M1 | NONE | — | — |

SYSTEM AND METHOD FOR MULTI-LEVEL BRIGHTNESS IN INTERFEROMETRIC MODULATION

RELATED APPLICATION

This application claims priority to U.S. Provisional Application No. 60/613,539, tilted "METHOD AND DEVICE FOR MULTI-LEVEL BRIGHTNESS IN INTERFEROMETRIC MODULATION", filed on Sep. 27, 2004, which is incorporated herein by reference in its entirety.

BACKGROUND OF THE INVENTION

1. Field of the Invention

The field of the invention relates to microelectromechanical systems (MEMS).

2. Description of the Related Technology

Microelectromechanical systems (MEMS) include micromechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. An interferometric modulator may comprise a pair of conductive plates, one or both of which may be transparent and/or reflective in whole or part and capable of relative motion upon application of an appropriate electrical signal. One plate may comprise a stationary layer deposited on a substrate, the other plate may comprise a metallic membrane separated from the stationary layer by an air gap. Such devices have a wide range of applications, and it would be beneficial in the art to utilize and/or modify the characteristics of these types of devices so that their features can be exploited in improving existing products and creating new products that have not yet been developed.

SUMMARY OF CERTAIN EMBODIMENTS

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

One embodiment comprises a display element. The display element includes at least one electrode having a plurality of active areas, wherein at least two of the sizes of the active areas being different with respect to each other. The display element also includes at least one array of interferometric modulators. Selected ones of the interferometric modulators are configured to be actuated by varying electrostatic forces in the interferometric modulators. The electrostatic forces in the interferometric modulators vary at least in part due to variations in the sizes of the active areas of electrodes in the interferometric modulators.

Another embodiment comprises a display. The display comprises a plurality of reflective display elements. Each of the display elements has a first electrode; and a second electrode having a substantially non-uniform width. The second electrode spans at least two display elements.

Another embodiment comprises a method. The method includes providing a voltage to an electrode having a substantially non-uniform width; and in response to the provided voltage, activating selected ones of a plurality of reflective display elements.

Yet another embodiment comprises a reflective display element. The display element includes a first electrode having a non-uniform width; and a second electrode. The first electrode is configured to activate selected portions of the first electrode in response to varying a difference in the voltage between the first electrode and the second electrode.

Yet another embodiment includes a method. The method includes varying a difference in voltage between a first electrode and a second electrode. The first electrode has a non-uniform shape. The varied voltage results in a change in an optical characteristic of an interferometric modulator. In response to the varied voltage, fractional portions of the second electrode are selectively activated or deactivated.

DETAILED DESCRIPTION OF THE CERTAIN EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the invention may be implemented in any device that is configured to display an image, whether in motion (e.g., video) or stationary (e.g., still image), and whether textual or pictorial. More particularly, it is contemplated that the invention may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

One embodiment is directed to an array of interferometric modulators. An electrode of non-uniform width is provided for selectively activating certain of the interferometric modulators in the array. The size of the active area of the electrode for certain interferometric modulators is larger than the active area of the electrode for other of the interferometric modulators. Thus, by varying the voltage that is provided to the electrode and the corresponding electrostatic forces, the number of interferometric modulators that are actuated can be controlled.

Figure 1:
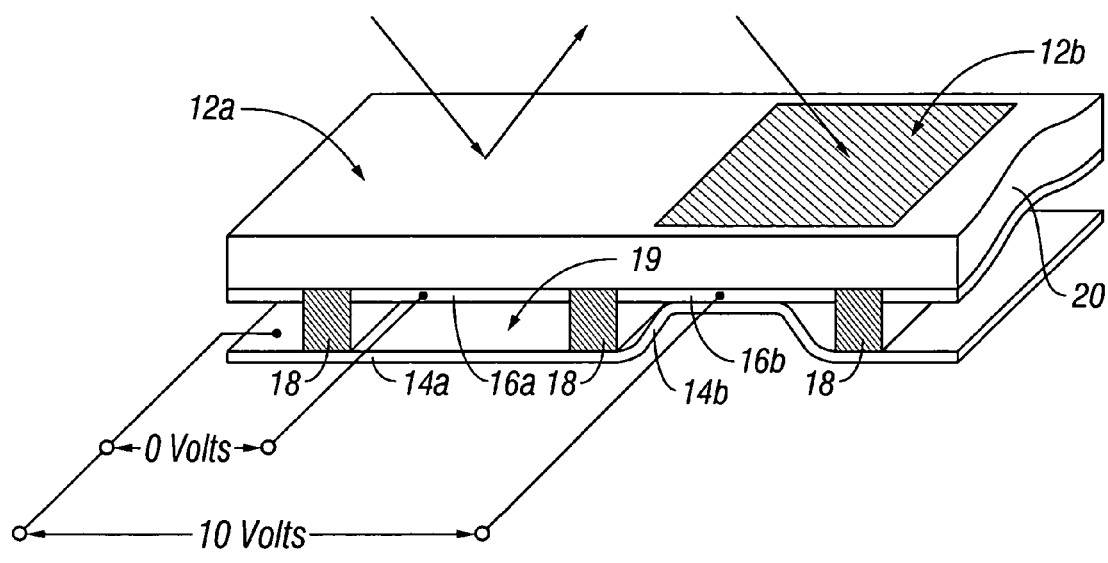
FIG. 1 is an isometric view depicting a portion of one embodiment of an interferometric modulator display in which a movable reflective layer of a first interferometric modulator is in a released position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the released state, the movable layer is positioned at a relatively large distance from a fixed partially reflective layer. In the second position, the movable layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable and highly reflective layer 14a is illustrated in a released position at a predetermined distance from a fixed partially reflective layer 16a. In the interferometric modulator 12b on the right, the movable highly reflective layer 14b is illustrated in an actuated position adjacent to the fixed partially reflective layer 16b.

The fixed layers 16a, 16b are electrically conductive, partially transparent and partially reflective, and may be fabricated, for example, by depositing one or more layers each of chromium and indium-tin-oxide onto a transparent substrate 20. The layers are patterned into parallel strips, and may form row electrodes in a display device as described further below. The movable layers 14a, 14b may be formed as a series of parallel strips of a deposited metal layer or layers (orthogonal to the row electrodes 16a, 16b) deposited on top of posts 18 and an intervening sacrificial material deposited between the posts 18. When the sacrificial material is etched away, the deformable metal layers are separated from the fixed metal layers by a defined air gap 19. A highly conductive and reflective material such as aluminum may be used for the deformable layers, and these strips may form column electrodes in a display device.

With no applied voltage, the cavity 19 remains between the layers 14a, 16a and the deformable layer is in a mechanically relaxed state as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable layer is deformed and is forced against the fixed layer (a dielectric material which is not illustrated in this Figure may be deposited on the fixed layer to prevent shorting and control the separation distance) as illustrated by the pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

Figure 2:
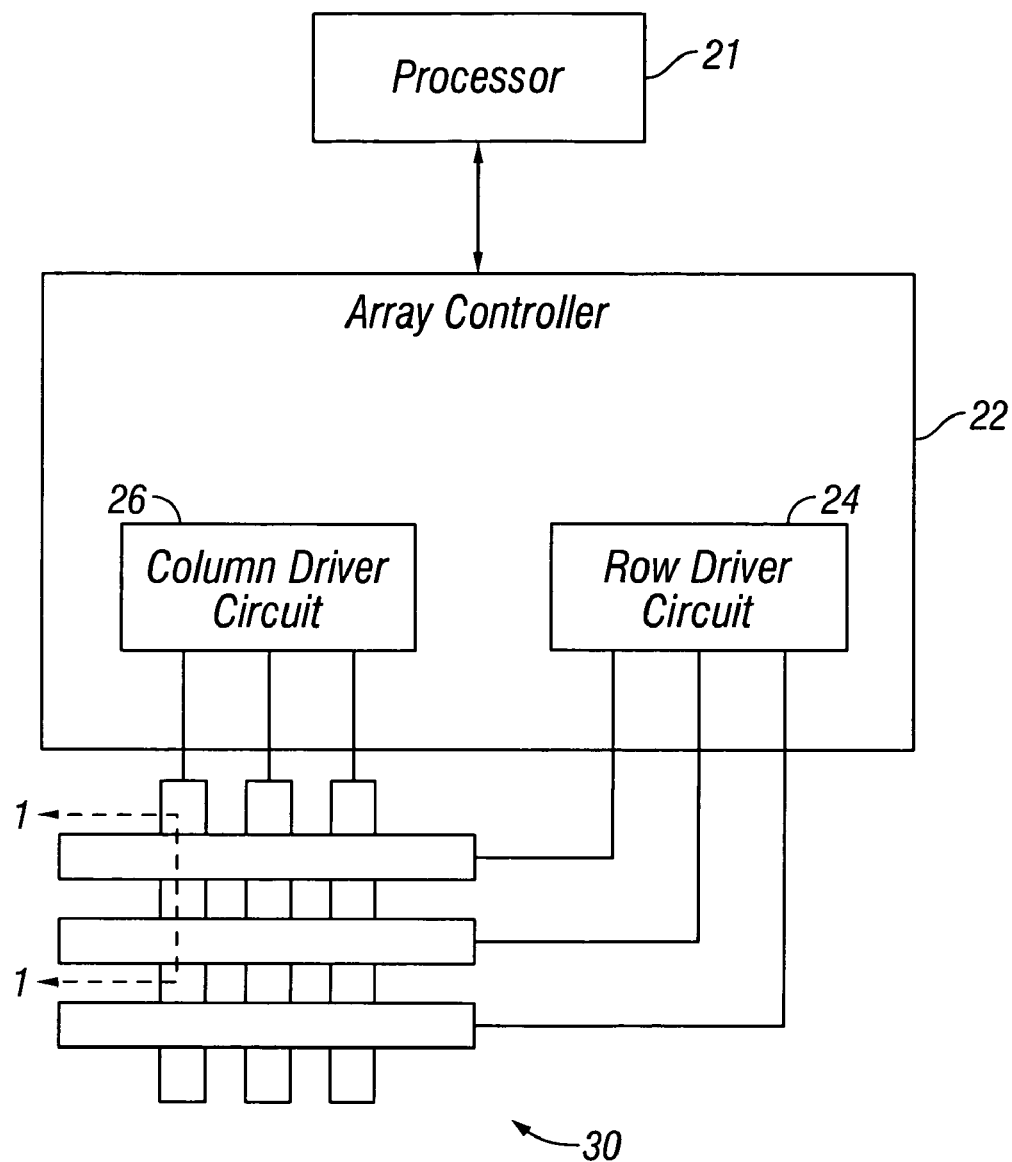
FIG. 2 is a system block diagram illustrating one embodiment of an electronic device incorporating a 3×3 interferometric modulator display.

FIGS. 2 through 5 illustrate one exemplary process and system for using an array of interferometric modulators in a display application. FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array controller 22. In one embodiment, the array controller 22 includes a row driver circuit 24 and a column driver circuit 26 that provide signals to a pixel array 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the released state to the actuated state. However, when the voltage is reduced from that value, the movable layer maintains its state as the voltage drops back below 10 volts. In the exemplary embodiment of FIG. 3, the movable layer does not release completely until the voltage drops below 2 volts. There is thus a range of voltage, about 3 to 7 V in the example illustrated in FIG. 3, where there exists a window of applied voltage within which the device is stable in either the released or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be released are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or released pre-existing state. Since each pixel of the interferometric modulator, whether in the actuated or released state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
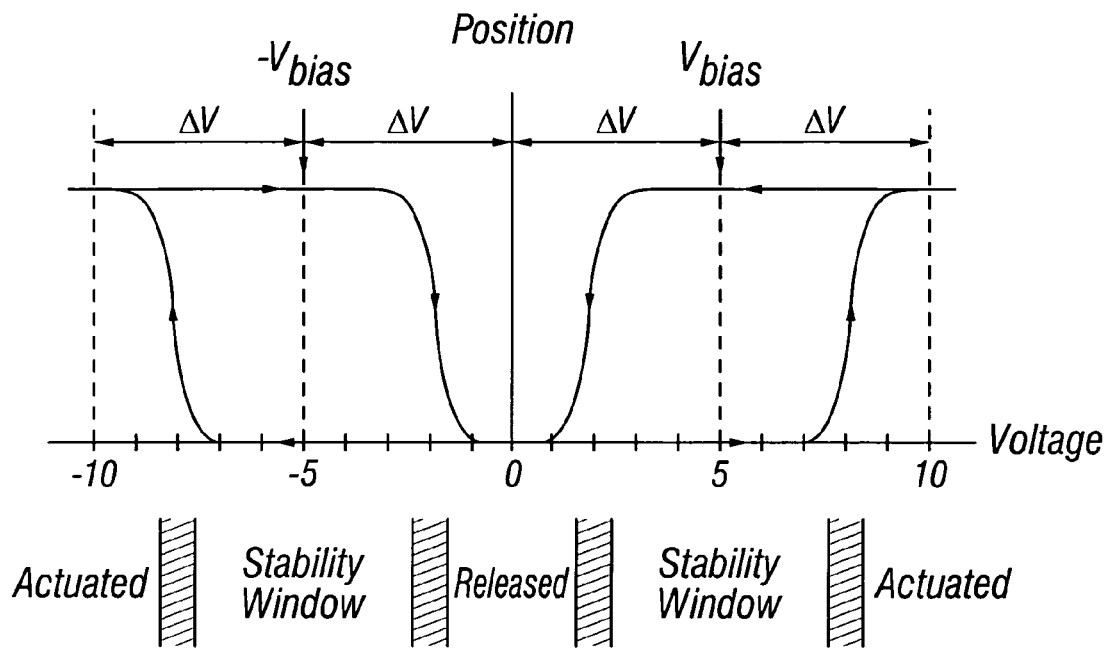
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Releasing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
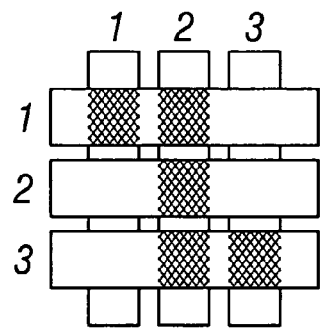
FIGS. 5A and 5B illustrate one exemplary timing diagram for row and column signals that may be used to write a frame of display data to the 3×3 interferometric modulator display of FIG. 2.
Figure 5B:
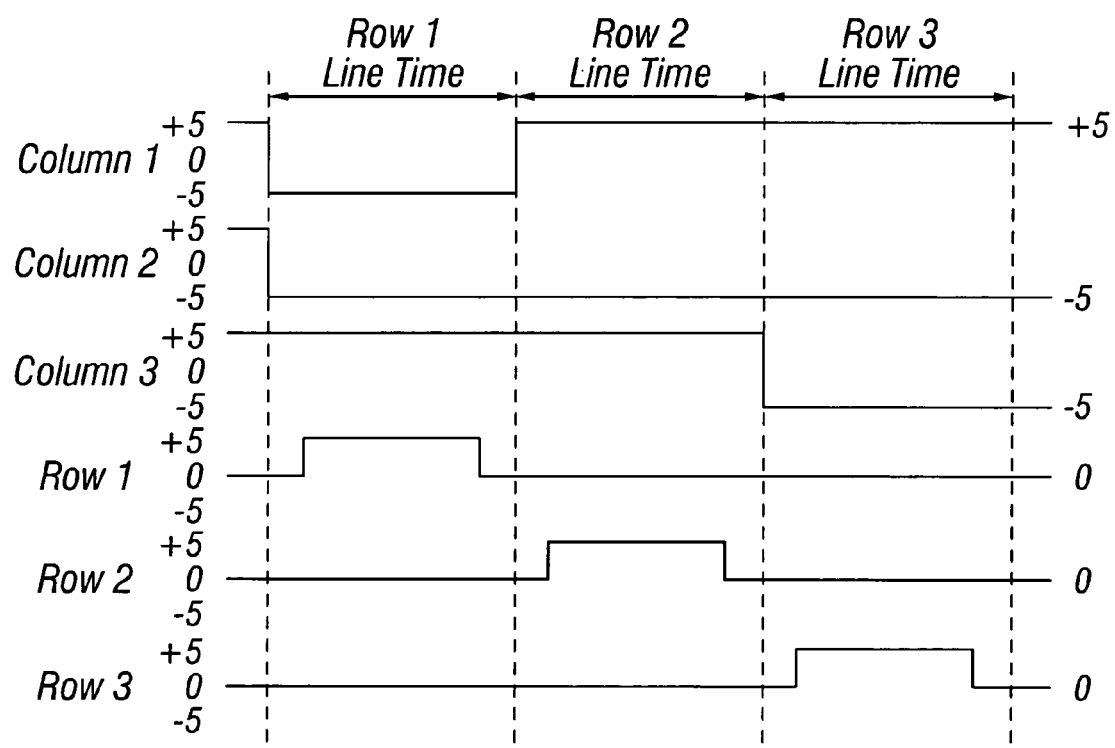

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or released states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and releases the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and release pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the present invention.

Figure 6A:
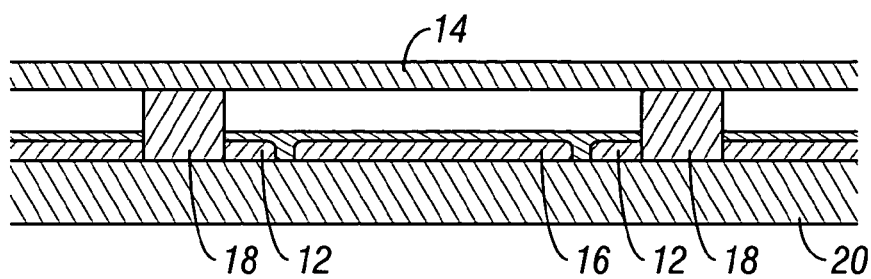
FIG. 6A is a cross section of the device of FIG. 1.
Figure 6B:
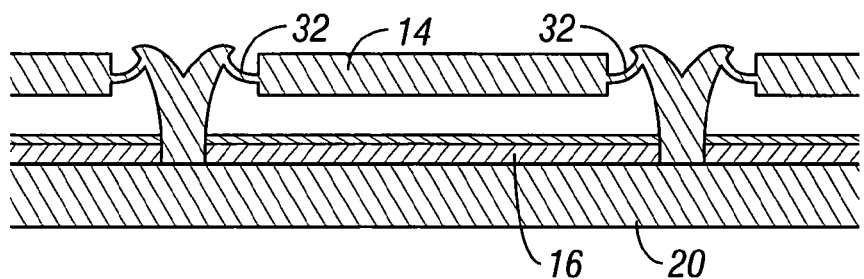
FIG. 6B is a cross section of an alternative embodiment of an interferometric modulator.
Figure 6C:
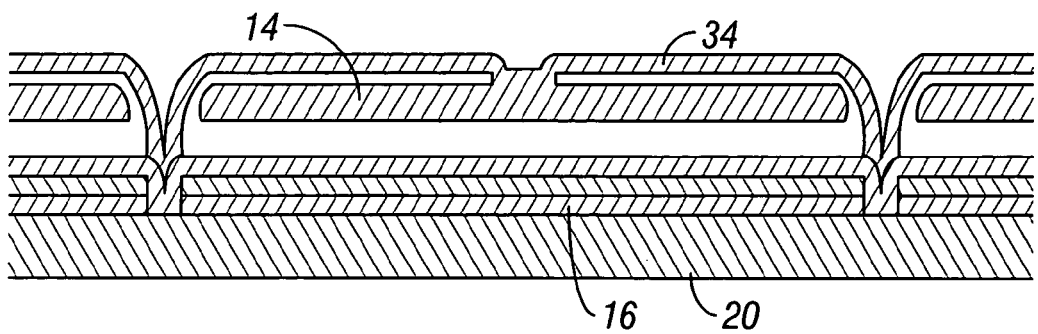
FIG. 6C is a cross section of another alternative embodiment of an interferometric modulator.

The details of the structure of interferometric modulators that operate in accordance with the principles set forth above may vary widely. For example, FIGS. 6A-6C illustrate three different embodiments of the moving mirror structure. FIG. 6A is a cross section of the embodiment of FIG. 1, where a strip of metal material 14 is deposited on orthogonally extending supports 18. A latch electrode 12 is configured to carry a latch voltage to hold the metal material 14 in an actuated state after being actuated. In one embodiment, the electrode 15 is patterned to have differing sizes of active areas under respective metal material 14 in different interferometric modulators, such as is described below with reference to FIGS. 9A and 9B.

In FIG. 6B, the moveable reflective material 14 is attached to supports at the corners only, on tethers 32. In FIG. 6C, the moveable reflective material 14 is suspended from a deformable layer 34. This embodiment has benefits because the structural design and materials used for the reflective material 14 can be optimized with respect to the optical properties, and the structural design and materials used for the deformable layer 34 can be optimized with respect to desired mechanical properties. The production of various types of interferometric devices is described in a variety of published documents, including, for example, U.S. Published Application 2004/0051929. A wide variety of well known techniques may be used to produce the above described structures involving a series of material deposition, patterning, and etching steps.

Figure 7:
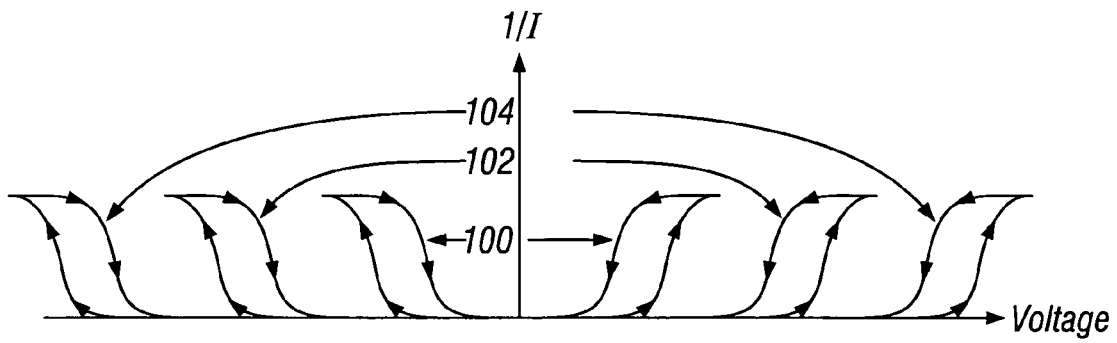
FIG. 7 illustrates the effects of electrode area size on the optical characteristics of a modulator without a latch electrode to fix the release characteristics.

FIG. 7 illustrates the optical response off the modulator of FIG. 6A as a function of the potential applied between metal material 14 and row electrode 16. In this illustrating set of curves no voltage is applied to latch electrodes 12. The actuation voltage and release voltage is a function of the area of electrode 16. As the area of electrode 16 is decreased, the optical response curves move outward. Hysteresis curve 100 represents the optical response of a modulator with electrode 16 patterned at a first area value. If the area of electrode 16 is decreased, then the optical response of the modulator is represented by curve 102. If the area of electrode 16 is further decreased, then the optical response of the modulator is represented by curve 104.

Figure 8:
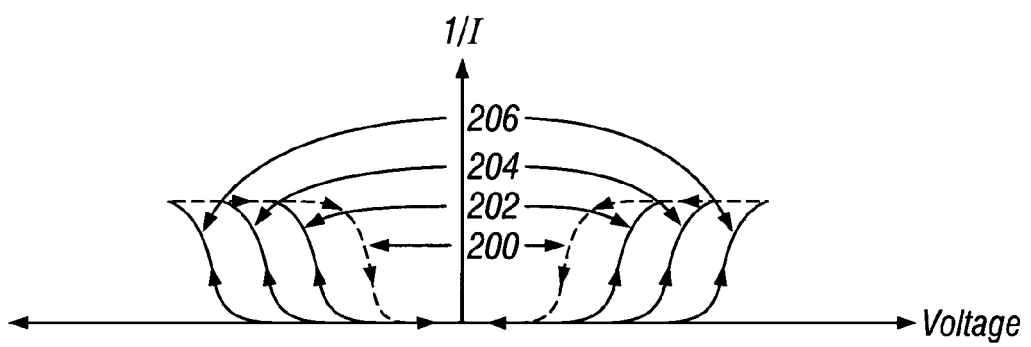
FIG. 8 illustrates the effects of electrode area size on the optical characteristics of a modulator with a latch electrode to fix the release characteristics.

FIG. 8 also illustrates the optical response of the modulator as a function of the potential applied between metal material 14 and row electrode 16. However in this case, a latch voltage is applied to latch electrodes 12. In this example, the actuation voltage still varies as a function of the area of electrode 16, but the release voltage is held constant by the potential applied to latch electrodes 12. This is because the peripheral potential dominates the release characteristics of an interferometric modulator. This is illustrated in FIG. 8 by having a common release curve 200, which is independent of the area of electrode 16. However, the actuation curves 202, 204 and 206 do change as a function of the area of electrode 16. As the active area of the electrode increases, so does the corresponding electrostatic forces between the electrode 16 and the metal material 14. Optical response curve 202 is an actuation curve for the modulator with electrode 16 of a first area. As the area of electrode 16 is decreased the optical response curves move outward. As the area of electrode 16 is decreased the actuation curve moves to curve 204, and as the area of electrode 16 is further decreased the actuation curve moves to optical response curve 206.

Figure 9A:
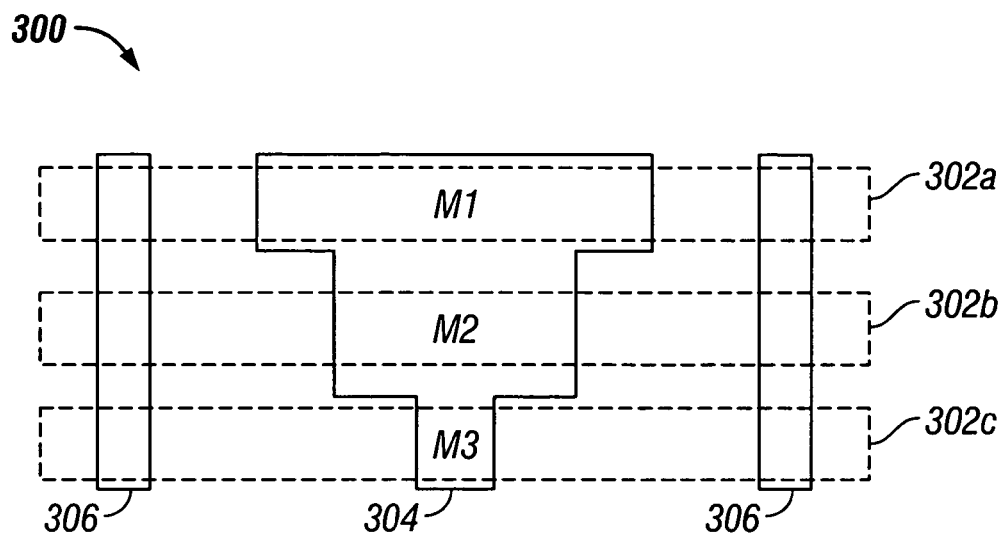
FIG. 9A is a top down cutaway view of one embodiment of the interferometric modulator of FIG. 1.
Figure 9B:
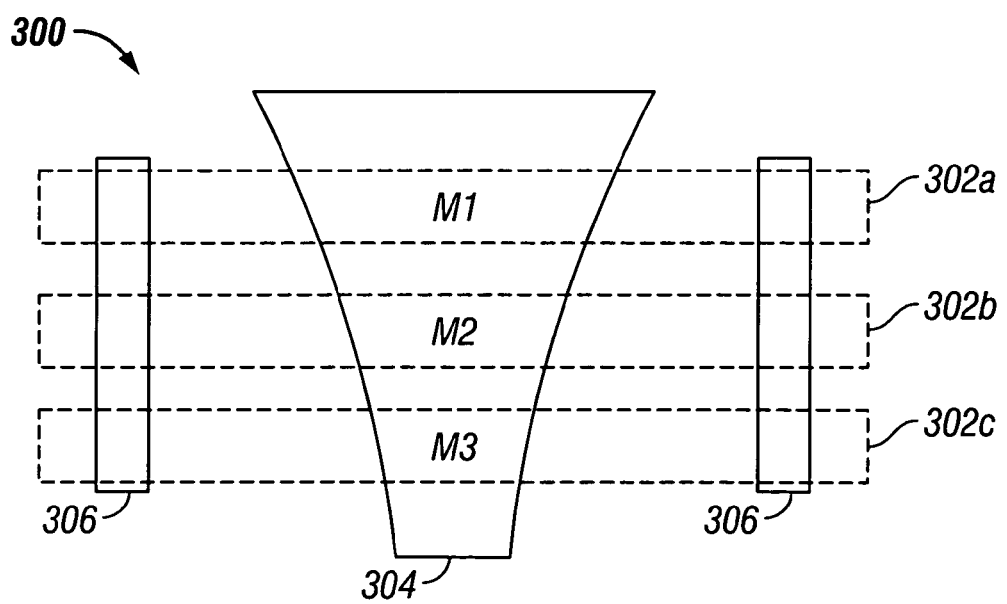
FIG. 9B is a top down cutaway view of another embodiment of the interferometric modulator of FIG. 1.

FIG. 9 illustrates a top down view of an exemplary embodiment of an interferometric modulator. As illustrated, the row electrodes 302a, 302b and 302c are shown. Each of the electrodes 302a, 302b and 302c correspond to the metal material 14 of FIG. 6A, 6B, and 6C. The electrode 304 of FIGS. 9A and 9B corresponds to the electrode 16 of FIGS. 6A, 6B, and 6C and may be used in the embodiments shown in those figures.

As is shown, the electrode 304 has a stair-stepped form. Depending on the embodiment, additional "steps" in the form may be provided and additional electrodes 302 can be provided for each of the additional steps. Furthermore, in one embodiment, multiple electrodes are provided for each of the steps in the form. Moreover, the other configurations may be used for the electrode. As is shown in FIG. 9B, the electrode 304 has non-linear edges.

In this embodiment, three separate applied voltages determine the optical response of modulator 300. A latch voltage is applied to latch electrodes 306, which is provided to control the release characteristics of modulator 300 as described above. A second voltage is applied to patterned electrode 304 and a third voltage level is applied to row electrode 302. In one embodiment, each of the electrodes 302a, 302b, and 302c are tied to a common voltage. In another embodiment, each of the 302a, 302b, and 302c electrodes can be individually driven to a selected voltage. In the illustrated example, the active area of electrode 304 beneath electrode 302a is the largest with respect to electrodes 302a, 302b and 302c. Therefore, as the voltage difference between electrode 304 and 302 increases, electrode 302a is the first to be pulled down to electrode 304, resulting in a first brightness level change. As the difference in potential between electrode 302 and electrode 304 is further increased, electrode 302b is the second portion of modulator 300 to be actuated, resulting in a second brightness level change in modulator 300 where both electrode 302a and electrode 302b are in an actuated position with the cavity between them and electrode 304 collapsed. Similarly, if the difference in potential further increases, it will reach a level where electrode 302c is actuated, such that all of electrodes 302a, 302b and 302c are brought into contact with electrode 304 resulting in a third optical change.

Figure 10:
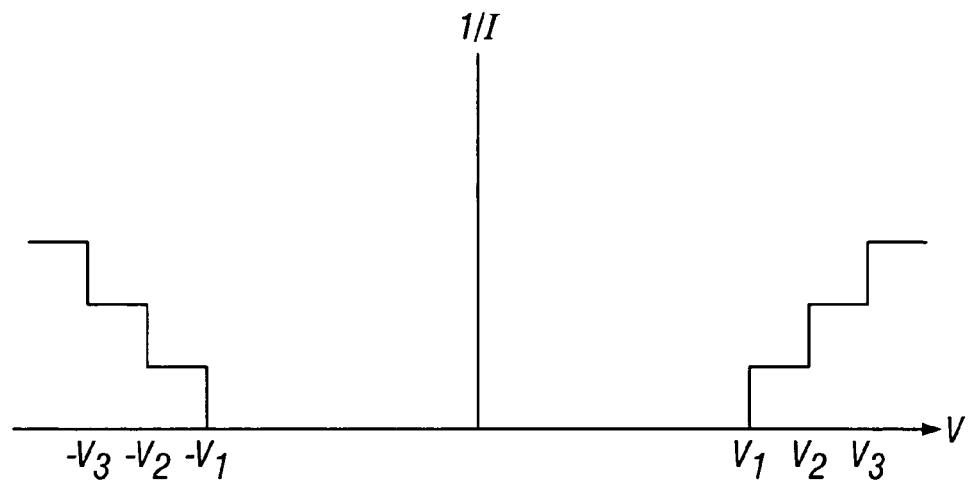
FIG. 10 is an optical response curve for the interferometric modulators of FIGS. 9A and 9B.

The optical response of modulator 300 is illustrated in FIG. 10. As shown the optical response is plotted as a function of the difference in potential between electrode 302 and electrode 304. When there is no difference in potential between electrodes 302a, 302b and 302c and 304, the optical response is at a maximum brightness with the cavities between electrodes 302a, 302b and 302c and electrode 304 being open, i.e., I, the intensity of light is high and the value of 1/I is low. As the difference in potential between electrode 304 and electrodes 302a, 302b and 302c is increased, it will actuate electrode 302a at a first voltage $V_1$. Electrode 302a has the largest active area. As the difference in potential is further increased, it will result in the actuation of electrode 302b at a second voltage $V_2$. Then, as the difference in potential between electrode 304 and 302 is further increased it will actuate electrode 302c at a third voltage $V_3$.

Figure 11:
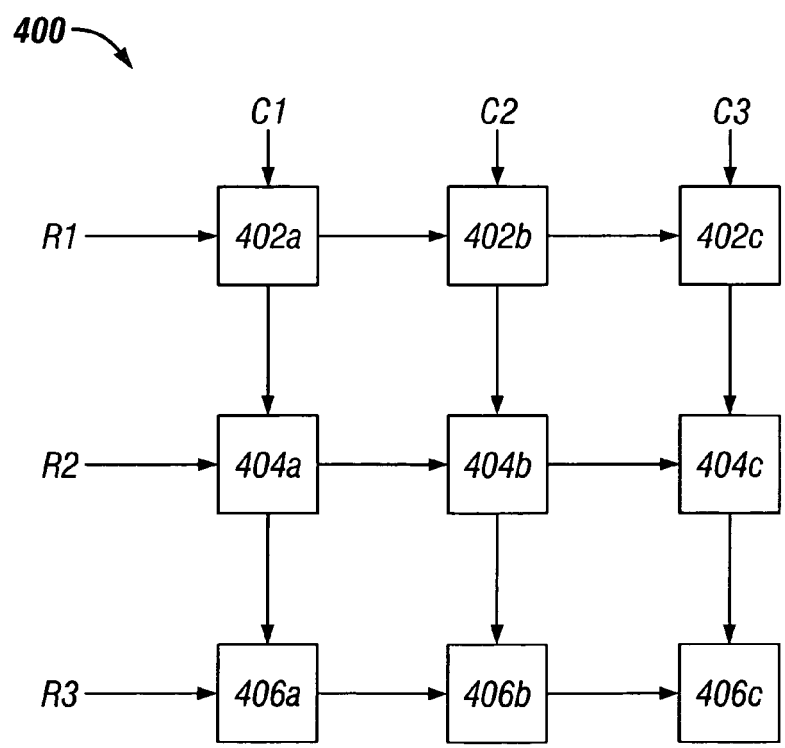
FIG. 11 is an exemplary sub-array of interferometric modulators.

FIG. 11 illustrates a 3 by 3 array of multi-level modulators 400, where each of the modulators is a modulator capable of four transmission states as described with respect to FIGS. 9 and 10. A strobe signal is provided on rows R1, R2 and R3 while a four level voltage data signal is provided on columns C1, C2 and C3. When the strobe signal is present, the column data signals can write to the modulators of the row. For example, when a strobe pulse is present of row R1 (and absent on rows R2 and R3), then signals provided on columns C1, C2 and C3 can change the optical response of modulators 402a, 402b and 402c but will not affect the optical response of modulators on rows R2 (modulators 404a, 404b and 404c) or row R3 (modulators 406a, 406b and 406c).

Figures 12A, 12B:
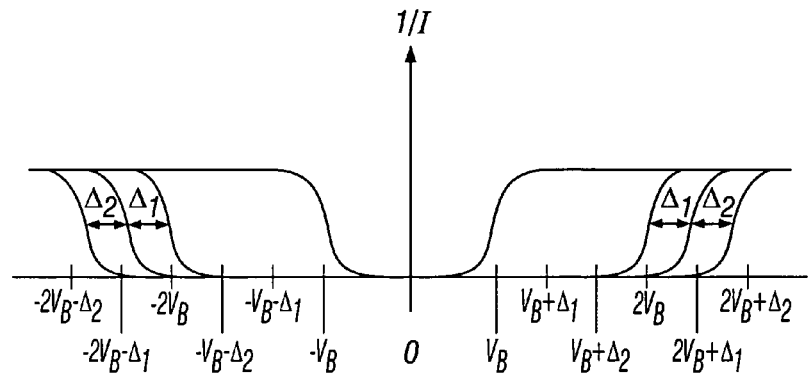
FIG. 12a illustrates in greater detail the optical response curves for the interferometric modulator of FIGS. 9A and 9B.
FIG. 12b is a table that describes the applied voltages and actuation and release of the interferometric modulator of FIG. 9.
Figure 13A:
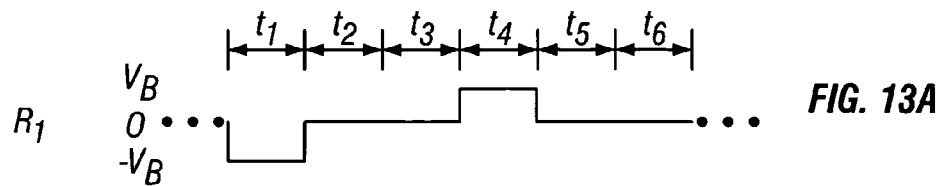
FIGS. 13A-13F are timing diagrams illustrating the signals driving the interferometric modulators of FIG. 11.
Figure 13B:
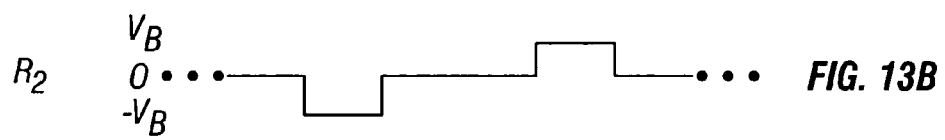
Figure 13C:
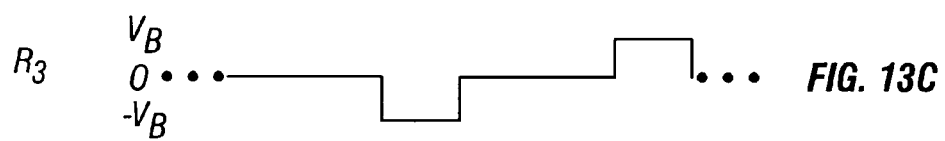
Figure 13D:
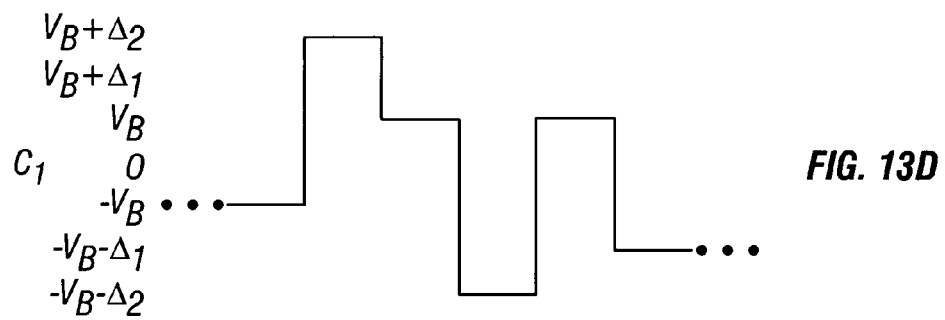
Figure 13E:
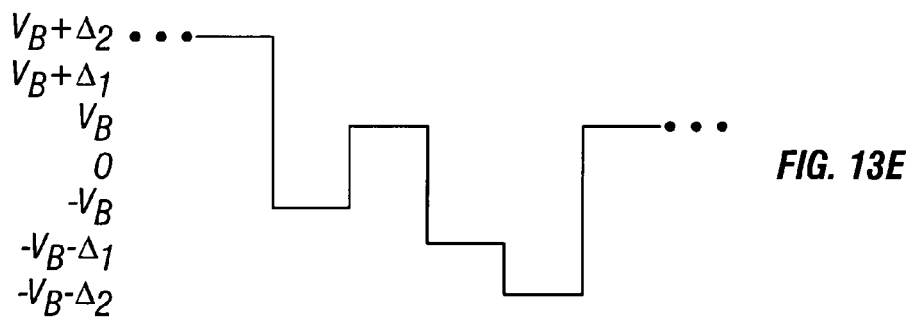
Figure 13F:
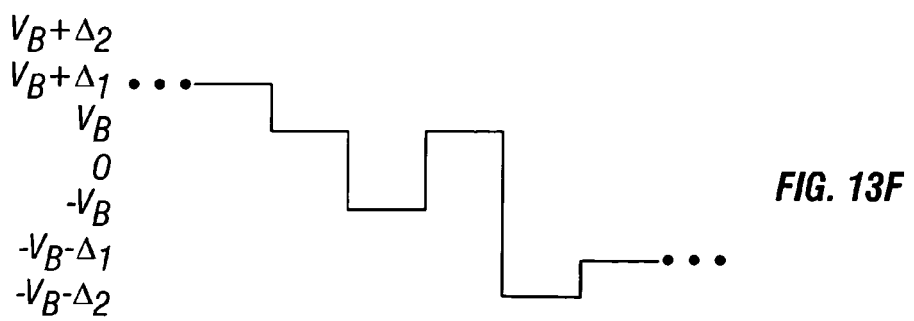

FIG. 12A illustrates the optical response of the multilevel modulator illustrated in FIG. 9. In the exemplary embodiment, the interferometric modulators provided in an array as illustrated in FIG. 4, a row is selected by applying a voltage of $+V_B$ or $-V_B$ to row electrodes 302.

In one embodiment, when the row is selected by applying a $-V_B$ voltage to electrode 302, the electrode 304 can assume the following valid voltage values $-V_B$, $V_B$, $V_B+\Delta_1$ and $V_B+\Delta_2$. This will result in the difference in potential between electrodes 302 and 304 taking the possible values of 0, $2V_B$, $2V_B+\Delta_1$, $2V_B+\Delta_2$, respectively. A difference potential between each electrode pair, e.g., electrode 202a and electrode 304 or electrode 302b and electrode 304 and 304 of 0 will leave all of the electrodes in the released position, where the gaps between electrodes 302a, 302b and 302c and electrode 304 are fully opened. In one embodiment, a difference in potential between electrodes 302a and 304 of $2V_B$ causes actuation while leaving electrodes 302b and 302c in the released position. A difference in potential between electrodes 302a and 304 and electrodes 302b and 304 of $2V_B+\Delta_1$ causes electrodes 302a and 302b to be actuated while leaving electrode 302c in the released position. A difference in potential between electrodes 302 and 304 of $2V_B+\Delta_2$ will cause electrodes 302a, 302b and 302c to be actuated. This ability to take advantage of the symmetric nature of the optical response curves offers operational advantages, such as charge balancing such that the repeated application of an electric filed modulator does not result in a permanent charges being built up in the structure.

In one embodiment, when the row is selected by applying $+V_B$ voltage to one of the electrodes 302a, 302b or 302c, the electrode 304 can assume the following valid voltage values $+V_B$, $-V_B$, $-V_B-\Delta_1$ and $-V_B-\Delta_2$. This will result in the difference between the electrodes 302 and 304 taking the possible values of 0, $-2V_B$, $-2V_B-\Delta_1$, $-2V_B\Delta_2$, respectively. A potential difference between each electrode pair will leave all of the electrodes 302a, 302b and 302c in the released position, where the gaps between electrodes 302a, 302b and 302c and electrode 304 are fully opened. In one embodiment, a difference in potential between electrodes 302a and 304 of $-2V_B$ causes electrode 302a to be actuated while leaving electrodes 302b and 302c in the released position. A difference in potential between electrodes 302a and 304 of $-2V_B-\Delta_1$ causes electrodes 302a and 302b to be actuated while leaving electrode 302c in the released position. A difference in potential between electrodes 302 and 304 of $-2V_B-\Delta_2$ causes electrodes 302a, 302b and 302c to be activated.

When a row is not selected, a low voltage, e.g., 0 volts, is applied to the electrodes 302a, 302b and 302c. In this case, in one embodiment, the resulting difference in potential between electrode 302 and 304 can take on the values $-V_B$, $V_B$, $V_B+\Delta_1$, $V_B+\Delta_2$, $+V_{B\;VB}-\Delta_1$ and $-V_B-\Delta_2$. In this embodiment, these potentials are not sufficient to actuate or release any of electrodes 302, because these potentials lie in the hysteresis region where if a modulator is in the released state it will remain open with the electrode released and if the modulator is in the actuated state it will remain actuated. FIG. 12B provides a table summarizing the information presented above. In FIG. 12B, selected rows indicate the voltage difference between the electrodes 302 and the electrode 304 and the following row indicates which of the electrodes are activated, i.e., electrode 302a (M1), electrode 302b (M2), electrode 302c (M3).

FIGS. 13A-13F are timing diagrams illustrating the signals driving modulator array 400. A time interval $t_1$, the modulators in row 1 of the array (402a, 402b and 402c) are selected to have their optical response selectively altered by data signals provided on column lines C1, C2 and C3. At time t1, a $-V_B$ potential is applied to row 1. The voltage applied to column C1 is $-V_B$, so the potential between the row and column electrodes of modulator 402a is 0 and all three of electrodes 302a, 302b and 302c will be in the released position. The voltage applied to column C2 is $V_B+\Delta_2$, so the potential between the row and column electrodes of modulator 402b is $2V_B+\Delta_2$ and all three of electrodes 302a, 302b and 302c will be in the actuated position. The voltage applied to column C3 is $V_B+\Delta_1$, so the potential between the row and column electrodes of modulator 402c is $2V_B+\Delta_1$ and electrodes 302a, 302b will be in the actuated position and electrode 302c will be in the released position.

A time interval $t_2$, the modulators in row 2 of the array (404a, 404b and 404c) are selected to have their optical response selectively altered by data signals provided on column lines C1, C2 and C3. At time t2, $-V_B$ is applied to row 2. The data voltage applied to column C1 is $V_B+\Delta_2$, so the potential between the row and column electrodes of modulator 404a is $2V_B+\Delta_2$ and all three of electrodes 302a, 302b and 302c will be set to the actuated position. The data voltage applied to column C2 is $-V_B$, so the potential between the row and column electrodes of modulator 404b is 0 and all three of electrodes 302a, 302b and 302c will be in the released position. The data voltage applied to column C3 is $V_B$, so the potential between the row and column electrodes of modulator 404c is $2V_B$ and electrodes 302a will be in the actuated position while electrodes 302b and 302c will be in the released position.

A time interval $t_3$, the modulators in row 3 of the array (406a, 406b and 406c) are selected to have their optical response selectively altered by data signals provided on column lines C1, C2 and C3. At time t2, $-V_B$ is applied to row 3. The data voltage applied to column C1 is $V_B$, so the potential between the row and column electrodes of modulator 406a is $2V_B$ and electrode 302a will be actuated while electrodes 302b and 302c will be set to the released position. The data voltage applied to column C2 is $V_B$, so the potential between the row and column electrodes of modulator 406b is $2V_B$ and electrode 302a will be actuated while electrodes 302b and 302c will be set to the released position. The data voltage applied to column C3 is $-V_B$, so the potential between the row and column electrodes is 0 and electrodes 302a, 302b and 302c will be set to the released position.

A time interval $t_4$, the modulators in row 1 of the array (402a, 402b and 402c) are again selected to have their optical response selectively altered by data signals provided on column lines C1, C2 and C3. At time $t_4$, $+V_B$ is applied to row 1. The data voltage applied to column C1 is $-V_B-\Delta_2$, so the potential between the row and column electrodes of modulator 402a is $-2V_B-\Delta_2$ and electrodes 302a, 302b and 302c will be actuated. The data voltage applied to column C2 is $-V_B-\Delta_1$, so the potential between the row and column electrodes of modulator 402b is $-2V_B-\Delta_1$ and electrode 302a will be actuated while electrodes 302b and 302c will be set to the released position. The data voltage applied to column C3 is $V_B$, so the potential between the row and column electrodes of modulator 402c is 0 and electrodes 302a, 302b and 302c will be set to the released position.

A time interval $t_5$, the modulators in row 2 of the array (404a, 404b and 404c) are selected to have their optical response selectively altered by data signals provided on column lines C1, C2 and C3. At time $t_5$, $+V_B$ is applied to row 2. The data voltage applied to column C1 is $V_B$, so the potential between the row and column electrodes of modulator 404a is $-0$ and electrodes 302a, 302b and 302c will be set to the released position. The data voltage applied to column C2 is $-V_B-\Delta_2$, so the potential between the row and column electrodes of modulator 404b is $-2V_B-\Delta_1$ and electrodes 302a and 302b will be actuated while electrode 302c is set to the released position. The data voltage applied to column C3 is $-V_B-\Delta_2$, so the potential between the row and column electrodes of modulator 404c is $-2V_B-\Delta_2$ and electrodes 302a, 302b and 302c will be set to the actuated position.

A time interval $t_6$, the modulators in row 3 of the array (406a, 406b and 406c) are selected to have their optical response selectively altered by data signals provided on column lines C1, C2 and C3. At time $t_6$, $-V_B$ is applied to row 3. The data voltage applied to column C1 is $-V_B-\Delta_1$, so the potential between the row and column electrodes of modulator 406a is $-2V_B-\Delta_1$ and electrodes 302a and 302b will be actuated while electrode 302c will be set to the released position. The data voltage applied to column C2 is $V_B$, so the potential between the row and column electrodes of modulator 406b is 0 and electrodes 302a, 302b and 302c will be set to the released position. The data voltage applied to column C3 is $-V_B-\Delta_2$, so the potential between the row and column electrodes of modulator 406c is $-V_B-\Delta_1$ and electrodes 302a and 302b will be actuated while electrode 302c will be set to the released position.

Figure 14:
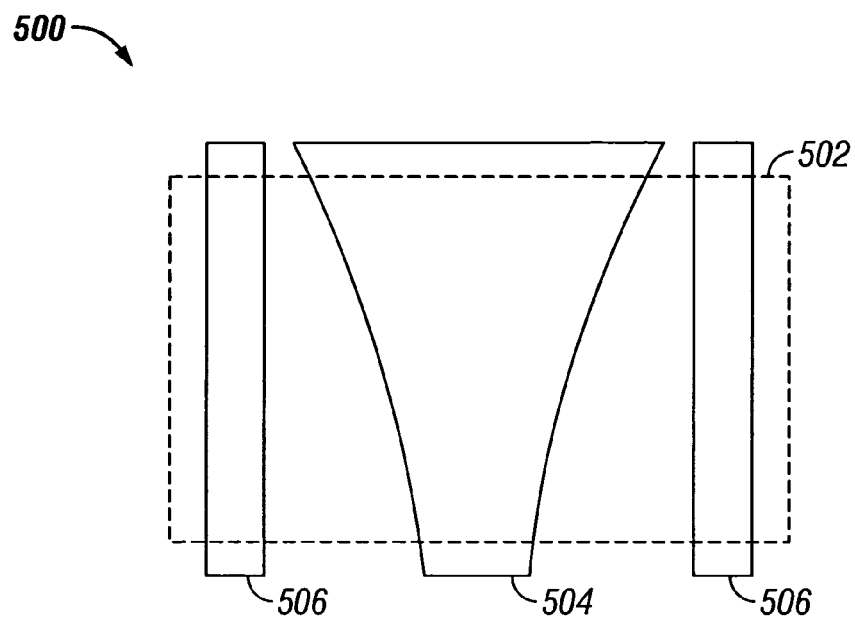
FIG. 14 is a top down cutaway view of another embodiment of an interferometric modulator.
Figure 15:
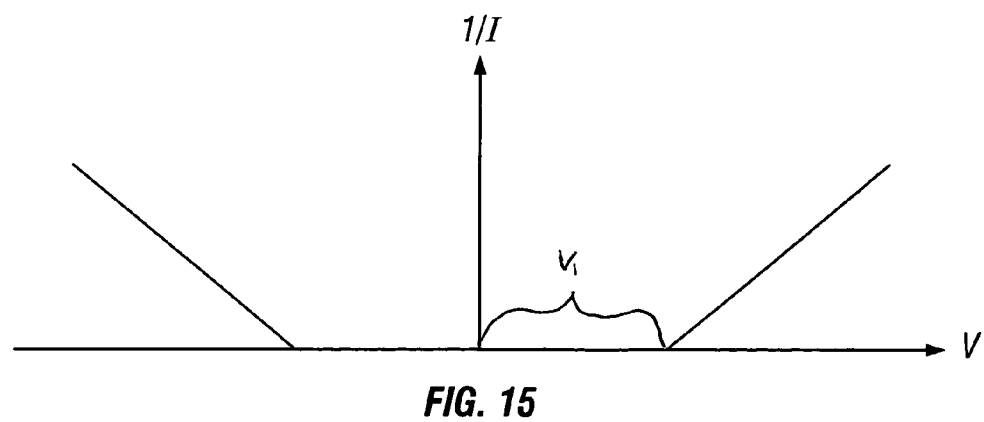
FIG. 15 is an optical response curve for a interferometric modulator of FIG. 14.

FIG. 14 illustrates an example of analog modulator structure. As described previously a latch voltage is applied to latch electrodes 506 in order to set the release characteristics of the modulator. An analog voltage is applied between column electrode 504 and row electrode 502. By patterning column electrode 504 such that it width varies, a predictable fraction of the electrode can be actuated in a predictable fashion by application of an analog voltage between column electrode 504 and row electrode 502. As may be appreciated, in response to an increasing difference in potential, the portion of the electrode 504 that is largest (such as the topmost portion of electrode 504 of FIG. 14) will cause actuation of the portion of the electrode 502 that is proximate to it before other portions of electrode 504 are actuated. FIG. 15 illustrates the optical response of analog modulator 500.

As can be seen visual inspection of FIG. 15, all desired optical responses of the modulator structure can be realized by providing the correct analog difference in potential between electrodes 502 and 504. This applied voltage difference will cause fractions of electrodes 504 and 502 to come into contact with one another. As is seen, after a difference in voltage $V_1$ is provided, the brightness of the interferometric modulator is progressively dimmed in response to further increases in differences in potential. The fraction of the interferometric modulator that is actuated determines the amount of light that is reflected, which in turn directly determines the brightness of the pixel displayed. An array of analog modulators 500 can be addressed in the same fashion as the array of multi-level modulators described above. One difference is that the data voltages in this case are analog and can take on any value and can provide any desired optical response.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A display device, comprising:
   at least one array of interferometric modulators, selected interferometric modulators comprising at least one electrode having a plurality of active areas of different sizes, the selected interferometric modulators actuating depending upon varying electrostatic forces in the interferometric modulators, the electrostatic forces in the interferometric modulators varying at least in part due to variations in the sizes of the active areas of electrodes in the selected interferometric modulators, wherein each of the interferometric modulators comprises a cavity and light is interferometrically modulated by the cavity and the electrodes.

2. The display device of claim 1, wherein at least one of the electrodes having the plurality of active areas of different sizes have a substantially staircase shape from a viewing perspective of the display element.

3. The display device of claim 1, wherein at least one of the electrodes having the plurality of active areas of different sizes have a pyramidal shape from a viewing perspective of the display element.

4. The display device of claim 1, additionally comprising a latch electrode for modifying an activation voltage threshold of at least one of the interferometric modulators.

5. The display device of claim 4, wherein the latch electrode is placed proximate to an end of an active area of the interferometric modulators.

6. The display element of claim 1, further comprising a latch electrode configured to substantially equalize a deactivation voltage of two or more of the interferometric modulators.

7. A display comprising:
   a plurality of reflective display elements, each of the display elements having:
   a first electrode;
   a second electrode having a substantially non-uniform width, wherein the second electrode spans at least two display elements; and
   a cavity between the first electrode and the second electrode, wherein light is interferometrically modulated by the cavity and the first and second electrodes.

8. The display of claim 7, wherein the first electrode is perpendicular to the second electrode.

9. The display element of claim 7, wherein the display element has a first optical property when the second electrode is in a non-activated state with respect to the first electrode, and wherein the display element has a second optical property when the second electrode is in an activated state with respect to the first electrode.

10. The display of claim 7, wherein the second electrode has a substantially staircase shape from a viewing perspective of the display.

11. The display of claim 7, wherein the second electrode has a pyramidal shape from a viewing perspective of the display.

12. The display of claim 7, additionally comprising a latch electrode for modifying an activation voltage threshold of at least one of the reflective display elements.

13. The display of claim 12, wherein the latch electrode is placed proximate to an end of an active area of the reflective display elements.

14. The display of claim 7, further comprising a latch electrode configured to substantially equalize a deactivation voltage of two or more of the reflective display elements.

15. A method comprising:
   providing a voltage to an electrode having a substantially non-uniform width;
   in response to the provided voltage, activating selected ones of a plurality of reflective display elements, the reflective display elements including an interferometric modulator comprising a second electrode and a cavity between the non-uniform width electrode and the second electrode; and
   interferometrically modulating light by the cavities and the first and second electrodes.

16. The method of claim 15, additionally comprising providing a latch voltage so to modify an activation voltage threshold of at least one of the reflective display elements.

17. The method of claim 16, wherein providing the latch voltage comprises providing the latch voltage to a latch electrode located proximate to an active area of the second electrode, and further wherein activating selected ones of the plurality of reflective display elements comprises activating two or more of the reflective display elements in response to different voltage levels, and deactivating two or more of the reflective display elements in response to substantially the same voltage level.

18. The method of claim 16, wherein the voltage provided to the substantially non-uniform width electrode is at a first level, the method further comprising:
providing a second voltage level to the second electrode of two or more of the reflective display elements, wherein activating the selected ones of a plurality of reflective display elements comprises activating two or more reflective display elements in response to different second voltage levels and deactivating two or more of the reflective display elements in response to substantially the same second voltage level.

19. The method of claim 18, wherein providing the second voltage comprises providing the second voltage level within a range wherein the two or more reflective display elements each maintain the activated or deactivated state.

20. The method of claim 15, wherein the electrode has a substantially staircase shape from a viewing perspective of the display.

21. The method of claim 15, wherein the electrode has a pyramidal shape from a viewing perspective of the display.

22. A reflective display element comprising:
a first electrode having a non-uniform width; and
a second electrode, wherein selected portions of the first electrode are configured to be activated in response to varying a difference in the voltage between the first electrode and the second electrode, the first and second electrode included within an interferometric modulator and forming a cavity therebetween, wherein light is interferometrically modulated by the cavity and the first and second electrodes.

23. The reflective display element of claim 22, wherein the first electrode is positioned substantially perpendicular to the second electrode.

24. The display element of claim 22, additionally comprising a latch electrode for modifying an activation voltage threshold of at least one of the reflective display elements.

25. A method comprising:
varying a difference in voltage between a first electrode and a second electrode, wherein the first electrode has a non-uniform shape, and wherein the varied voltage results in a change in an optical characteristic of an interferometric modulator;
in response to the varied voltage, selectively activating or deactivating fractional portions of the second electrode; and
interferometrically modulating light by a cavity of the interferometric modulator and the first and second electrodes, the cavity of the interferometric modulator being between the first and second electrodes.

26. The method of claim 25, additionally comprising providing a latch voltage to maintain the actuated portion of the second electrode in an actuated state.

* * * * *

UNITED STATES PATENT AND TRADEMARK OFFICE
CERTIFICATE OF CORRECTION

PATENT NO. : 7,302,157 B2 Page 1 of 2
APPLICATION NO. : 11/096545
DATED : November 27, 2007
INVENTOR(S) : Clarence Chui It is certified that error appears in the above-identified patent and that said Letters Patent is hereby corrected as shown below:

On the Title Page Item -56- Page 3,
Line 15, delete "Goosen," insert -- Goossen --.

On the Title Page Item -56- Page 3,
Line 30, delete "Goosen," insert -- Goossen --.

On the Title Page Item -56- Page 4,
Line 15, delete "Gutlowski," insert -- Gutkowski --.

Title Page Item -56- Other Pub. Page 5,
Line 1, delete "curcuit," insert -- circuit --.

Title Page Item -56- Other Pub. Page 5,
Line 21, delete "MTT-S," insert -- MTTS --.

Title Page Item -56- Other Pub. Page 5,
Line 39, delete "24," insert -- 23 --.

Title Page Item -56- Other Pub. Page 5,
Line 11, delete "SiO2," insert -- $SiO_2$ --.

Title Page Item -56- Other Pub. Page 5,
Line 58, delete "Michromachined," insert -- Micromachined --.

Column 1,
Line 22, after "and" delete "or" and insert -- /or --.

Column 3,
Line 1, delete "a" and insert -- an --.

Column 7,
Line 45, delete "FIG." and insert -- FIGS. --.

Column 8,
Line 56, after "difference" insert -- in --.

UNITED STATES PATENT AND TRADEMARK OFFICE
CERTIFICATE OF CORRECTION

PATENT NO. : 7,302,157 B2
APPLICATION NO. : 11/096545
DATED : November 27, 2007
INVENTOR(S) : Clarence Chui It is certified that error appears in the above-identified patent and that said Letters Patent is hereby corrected as shown below:

<u>Column 9,</u>
Line 12, after "difference" insert -- in potential --.

<u>Column 9,</u>
Line 31, after "$V_B+\Delta_2$," delete "$+V_{B\ VB}- \Delta_1$" insert -- $+V_B, -V_B, -V_B-\Delta_1$ --.

<u>Column 10,</u>
Line 12, delete "t2," insert -- t3 --.

Signed and Sealed this

Seventeenth Day of June, 2008

JON W. DUDAS
*Director of the United States Patent and Trademark Office*